United States Patent
Wu

(10) Patent No.: US 8,474,088 B2
(45) Date of Patent: Jul. 2, 2013

(54) WINDSHIELD WIPER

(75) Inventor: Shengzhu Wu, Xiamen (CN)

(73) Assignee: Xiamen Meto Auto Parts Co., Ltd., Xiamen, Fujian (CN)

( * ) Notice: Subject to any disclaimer, the term of this patent is extended or adjusted under 35 U.S.C. 154(b) by 184 days.

(21) Appl. No.: 13/179,543

(22) Filed: Jul. 10, 2011

(65) Prior Publication Data

US 2013/0007975 A1 Jan. 10, 2013

(51) Int. Cl.
*B60S 1/38* (2006.01)
(52) U.S. Cl.
USPC .................................................. 15/250.32
(58) Field of Classification Search
USPC ............... 15/250.32, 250.43, 250.44–250.48, 15/250.361, 250.201
See application file for complete search history.

(56) References Cited

U.S. PATENT DOCUMENTS

| 3,254,358 | A | * | 6/1966 | Wise | 15/250.32 |
|---|---|---|---|---|---|
| 2010/0186185 | A1 | * | 7/2010 | Grasso et al. | 15/250.32 |
| 2012/0180248 | A1 | * | 7/2012 | Depondt | 15/250.32 |
| 2012/0227206 | A1 | * | 9/2012 | Depondt | 15/250.32 |

* cited by examiner

*Primary Examiner* — Mark Spisich
*Assistant Examiner* — Andrew A Horton

(57) ABSTRACT

A windshield wiper includes a wiper post and a connection unit which is used to connect the wiper post and a wiper arm. The wiper rod has a bottom connected with a rubber blade. The wiper post has an opening at a central portion thereof, a recess at a central bottom of the opening, and a resilient plate disposed on the recess. One end of the resilient plate is connected with the bottom of the opening, and another end of the resilient plate is suspended above the recess and has an engaging buckle. The opening has protruding steps which are formed at two sides of the resilient plate. The protruding steps each have a vertical surface formed with a lumpy section. The connection unit is detachably mounted in the opening of the wiper post. The connection unit has a bottom formed with a protruding platform corresponding to the opening. The protruding platform has a slide trough at a central portion thereof corresponding to the resilient plate. Two sides of the protruding platform each have a vertical surface formed with a lumpy portion corresponding to the lumpy section of the opening.

6 Claims, 12 Drawing Sheets

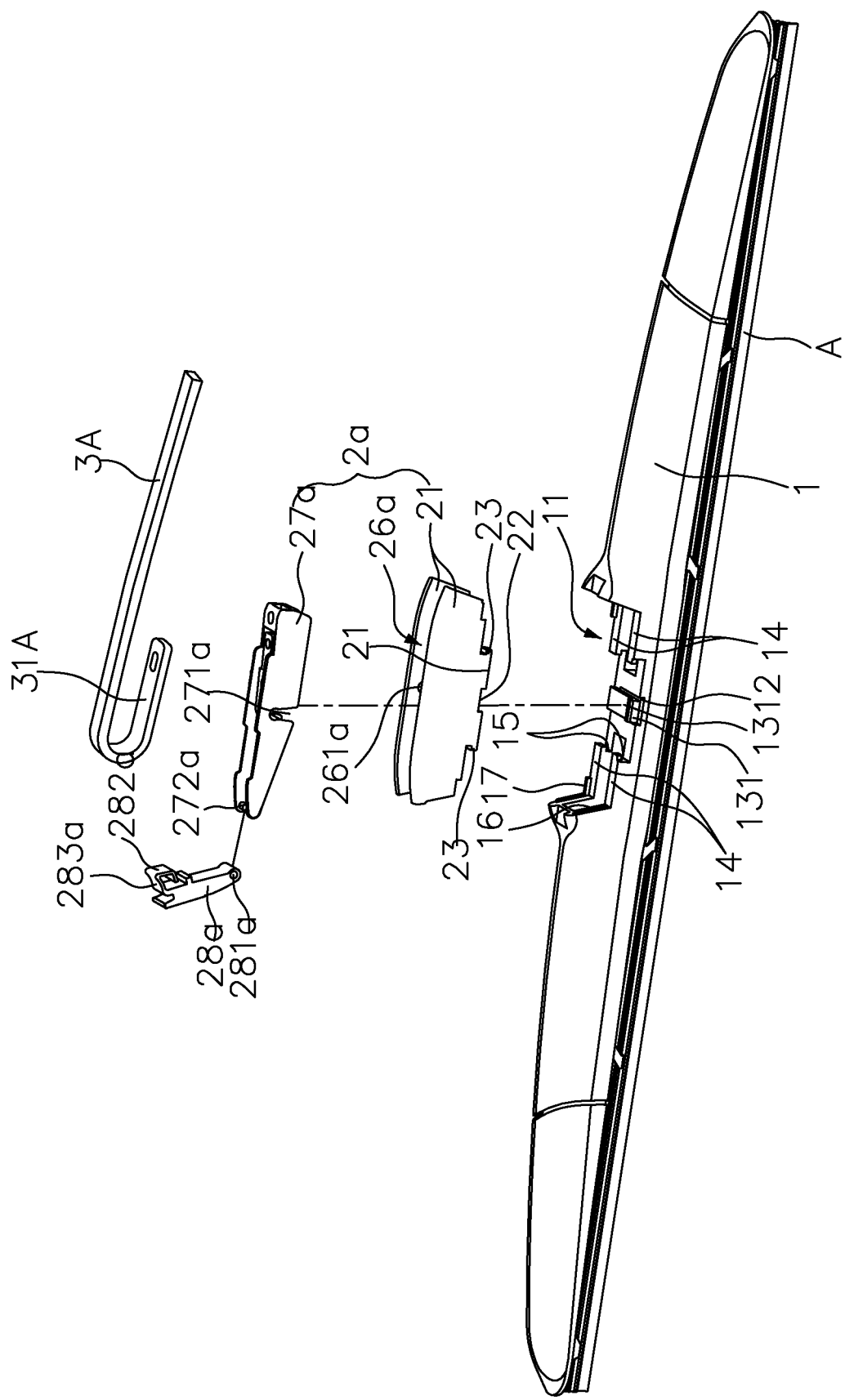
F I G. 4

WINDSHIELD WIPER

BACKGROUND OF THE INVENTION

1. Field of the Invention

The present invention relates to a windshield wiper.

2. Description of the Prior Art

A windshield wiper is used to scrub rainwater or dust on the windshield. The wiper post of the windshield wiper is connected with a wiper arm through a connection unit. In general, the configuration of the connection unit is mated with the configuration of the wiper arm. The connection unit is fixedly connected to the middle of the wiper post by welding or riveting.

Once the wiper post or the connection unit is damaged, the whole windshield wiper must be replaced with a new one. Besides, the wiper arm has to mate with a corresponding connection unit according to various models of vehicles. Because the connection unit is mounted in a fixed way, the windshield wiper cannot be widely used to various vehicles. Accordingly, the inventor of the present invention has devoted himself based on his many years of practical experiences to solve these problems.

SUMMARY OF THE INVENTION

The primary object of the present invention is to provide a windshield wiper. The wiper post and the connection unit of the present invention are detachably connected. This is convenient for assembly and disassembly. Another object of the present invention is that the wiper post can be connected with various wiper arms through different configurations of the connection unit.

In order to achieve the aforesaid object, the windshield wiper of the present invention comprises a wiper post and a connection unit which is used to connect the wiper post and a wiper arm. The wiper rod has a bottom connected with a rubber blade. The wiper post has an opening at a central portion thereof, a recess at a central bottom of the opening, and a resilient plate disposed on the recess. One end of the resilient plate is connected with the bottom of the opening, and another end of the resilient plate is suspended above the recess and has an engaging buckle. The opening has protruding steps which are formed at two sides of the resilient plate. The protruding steps each have a vertical surface formed with a lumpy section. The connection unit is detachably mounted in the opening of the wiper post. The connection unit has a bottom formed with a protruding platform corresponding to the opening. The protruding platform has a slide trough at a central portion thereof corresponding to the resilient plate. Two sides of the protruding platform each have a vertical surface formed with a lumpy portion corresponding to the lumpy section of the opening.

Preferably, a side wall of the opening is formed with an engaging groove and a stop piece which are spaced. An end of the connection unit has a protruding rib corresponding to the engaging groove and a notch corresponding to the stop piece. When the connection unit is mounted in the opening, the notch is against the stop piece and the protruding rib is engaged in the engaging groove.

Preferably, an engaging platform is provided on the slide trough. After the connection unit is mounted, the engaging buckle of the resilient plate cooperates with the engaging platform to press the connection unit tightly.

Preferably, the connection unit is a first connection unit used to connect a hook-typed wiper arm. The first connection unit has a limit trough at a central portion thereof and a cylindrical post in the limit trough. The limit trough is to receive a connection member therein. The connection member has a hollow middle portion and an engaging recess facing down. When assembled, the engaging recess of the connection member is engaged on the cylindrical post of the limit trough of the first connection unit. Front and rear ends of the connection member each have a pin hole for insertion of a pin which is pivotally connection with an upper lid. The upper lid has a front end formed with a pivot hole and a rear end formed with a protrusion. The protrusion has a curved side surface to secure the hook-typed wiper arm.

Preferably, the connection unit is a second connection unit used to connect a pin-typed wiper arm. The second connection unit has a pivot hole at a top end thereof. A connection member is fitted on the second connection unit. The connection member has a hollow lower end and a U-shaped engaging trough facing down. The connection member has a circle hole corresponding in position to the pivot hole and a plurality of slots on a top end thereof to communicate with the engaging trough.

Preferably, the connection unit is a third connection unit used to connect a conventional wiper arm. The third connection unit has a V-shaped opening, a mounting hole, a limit step beside the opening, and a resilient engaging piece which is disposed inside the third connection unit close to the mounting hole. An upper end of the third connection unit has a buckle recess and a pivot at one end of the buckle recess for connection of an upper lid. The upper lid has a front end formed with an open recess corresponding to the pivot, two engaging detents at a middle portion thereof, and a press block at a rear end thereof.

As the above-mentioned, the wiper post and the connection unit of the present invention are detachably connected. This is convenient for replacement of the connection unit, without riveting or welding connection. The connection unit has a configuration to mate with different wiper arms, so that the wiper post can be connected with various wiper arms through the connection unit.

BRIEF DESCRIPTION OF THE DRAWINGS

FIG. 4 is an exploded view showing the first connection unit and the hook-typed wiper arm according to the preferred embodiment of the present invention;

DETAILED DESCRIPTION OF THE PREFERRED EMBODIMENTS

Embodiments of the present invention will now be described, by way of example only, with reference to the accompanying drawings.

Figure 1:
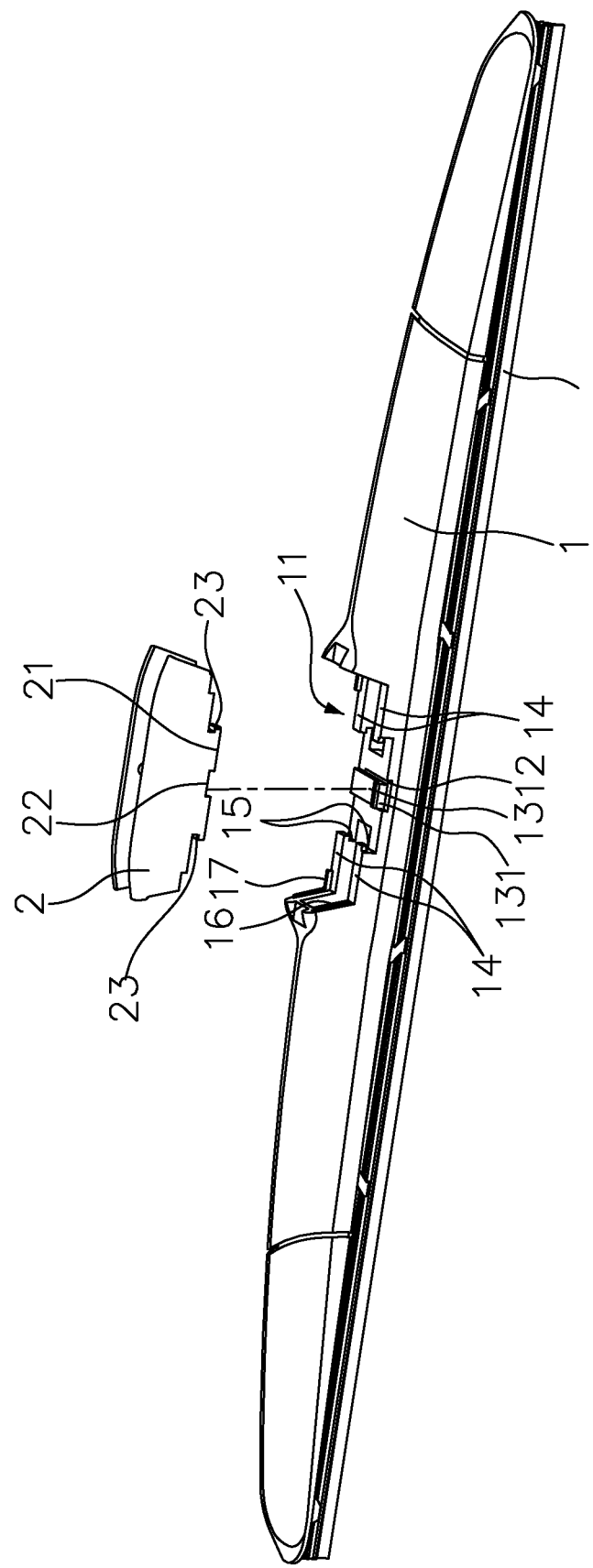
FIG. 1 is an exploded view according to the preferred embodiment of the present invention.
Figure 2:
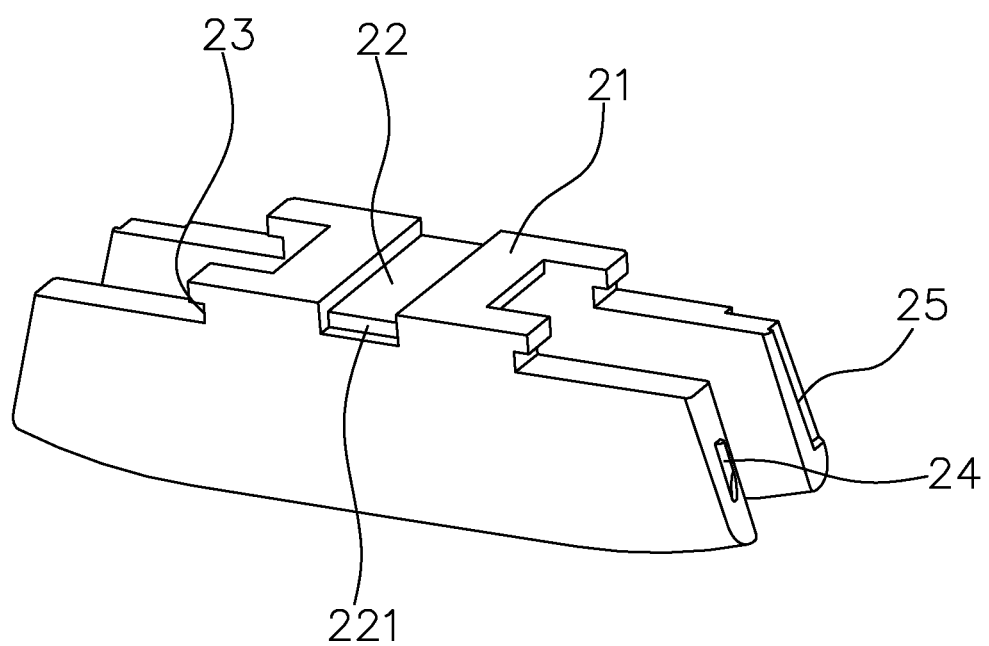
FIG. 2 is a perspective view showing the bottom configuration of the connection unit according to the preferred embodiment of the present invention.

As shown in FIG. 1 and FIG. 2, the windshield wiper of the present invention comprises a wiper post 1 and a connection unit 2 which is used to connect the wiper post and a wiper arm. The bottom of the wiper rod 1 is connected with a rubber blade A. The wiper post 1 has an opening 11 at a central portion thereof, a recess 12 at a central bottom of the opening 11, and a resilient plate 13 disposed on the recess 12. One end of the resilient plate 13 is connected with the bottom of the opening 11, and another end of the resilient plate 13 is suspended above the recess 12 and has an engaging buckle 131. The bottom of the opening 11 has protruding steps 14 which are formed at two sides of the resilient plate 13. The protruding steps 14 each have a vertical surface formed with a lumpy section 15. A side wall of the opening 11 has an engaging groove 16. A stop piece 17 is provided on the bottom of the opening 11.

The connection unit 2 is detachably mounted in the opening 11 at the middle portion of the wiper post 1. The bottom of the connection unit 1 is mated with the configuration of the opening 11 of the wiper post 1. The connection unit 2 has a bottom formed with a protruding platform 21. The protruding platform 21 has a slide trough 22 at a central portion thereof, corresponding to the resilient plate 13. Two sides of the protruding platform 21 each have a vertical surface formed with a lumpy portion 23 corresponding to the lumpy section 15 of the protruding step 14. Two sides of the connection unit 2 each have a protruding rib 24 corresponding to the engaging groove 16 of the opening 11 and a notch 25 corresponding to the stop piece 17. When the connection unit 2 is mounted in the opening 11, the notch 25 is against the stop piece 17 and the protruding rib 24 is engaged in the engaging groove 16. Furthermore, a stepped engaging platform 221 is provided on the slide trough 22. After the connection unit 2 is mounted, the engaging buckle 131 of the resilient plate 13 cooperates with the engaging platform 221 to press the connection unit 2 tightly.

Figure 3:
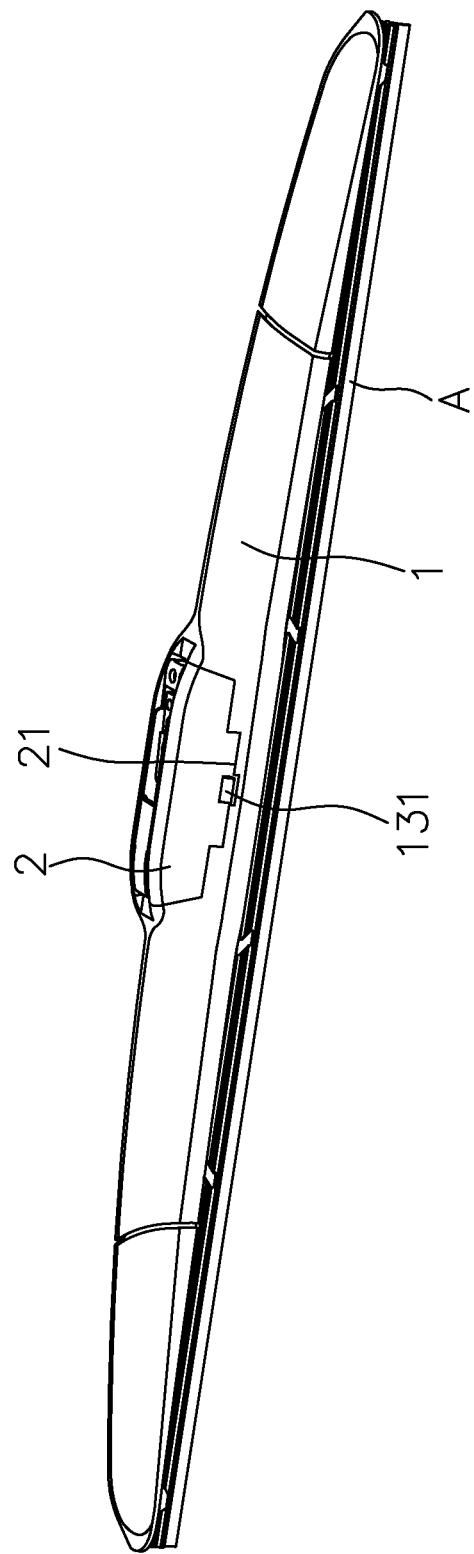
FIG. 3 is a perspective view according to the preferred embodiment of the present invention.

FIG. 3 shows assembly of the connection unit 2 and the wiper post 1. The slide trough 22 of the connection unit 2 is aligned with the resilient plate 13 in the opening 11, and then the resilient plate 13 is pressed down to be in the recess 22. The lumpy portion 23 of the connection unit 2 mates with the lumpy section 15 in the opening 11, and then the connection unit 2 is slid in from the front end of the wiper rod 1 until the notches 25 at the two sides of the connection unit 2 are against the stop piece 17 at the bottom of the opening 11 and the protruding ribs 24 are engaged in the engaging grooves 16. At this time, the engaging buckle 131 of the resilient plate 13 is bounced up and cooperates with the engaging platform 221 to press the connection unit 2 tightly, such that the connection unit 2 is mounted on the wiper post 1 steadily. The lumpy portion 23 of the connection unit 2 and the lumpy section 15 in the opening 11 can prevent the connection unit 2 from disengagement. The notches 25 of the connection unit 2 mating with the stop piece 17 at the bottom of the opening 11, the protruding ribs 24 mating with the engaging grooves 16, and the engaging buckle 131 of the resilient plate 13 mating with the engaging platform 221 of the connection unit 2 are used to limit and position the connection unit 2 so as to prevent the connection unit 2 from disengagement. If the user wants to detach the connection unit 2 from the wiper rod 1, he/she can press down the engaging buckle 131 of the resilient plate 13 and the resilient plate 13 is pressed in the recess 12, such that the connection unit 2 can be detached from the wiper post 1.

The connection unit 2 is detachably connected to the wiper post 1. This is convenient to assemble or disassemble the wiper post 1 and the connection unit 2. The connection unit 2 is adapted for various mating wiper arms, so that the wiper post 1 can be connected with various wiper arms through the connection unit 2.

The embodiments of the connection unit of the present invention and various wiper arms are described hereinafter.

Figure 4A:
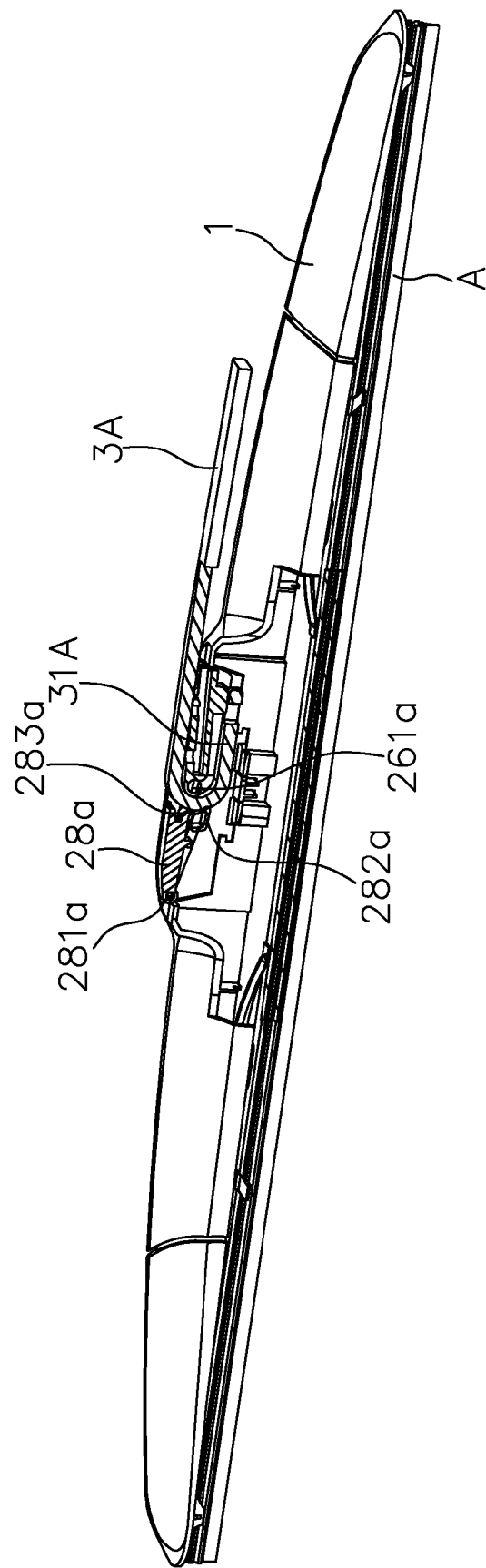
FIG. 4A is a schematic view showing the first connection unit and the hook-typed wiper arm according to the preferred embodiment of the present invention.

FIG. 4 and FIG. 4A show connection of the first connection unit 2a of the present invention and a hook-typed wiper arm 3A. The connection of the first connection unit 2a and the wiper post 1 is same as the aforesaid. The first connection unit 2a has a limit trough 26a at a central portion thereof and a cylindrical post 261a in the limit trough 26a. The limit trough 26a is to receive a connection member 27a therein. The connection member 27a may be integrally formed with the first connection unit 2a or separate from the first connection unit 2a. In this embodiment, the connection member 27a is assembled to the first connection unit 2a. The connection member 27a is mounted in the limit trough 26a of the first connection unit 2a. The connection member 27a has a hollow middle portion and an engaging recess 271a facing down. When assembled, the engaging recess 271a of the connection member 27a is engaged on the cylindrical post 261a of the limit trough 26a of the first connection unit 2a. Front and rear ends of the connection member 27a each have a pin hole 272a for insertion of a pin which is pivotally connection with an upper lid 28a. The upper lid 28a has a front end formed with a pivot hole 281a and a rear end formed with a protrusion 282a. The protrusion 282a has a curved side surface 283a.

The first connection unit 2a of the present invention uses the connection member 27a to connect the hook-typed wiper arm 3A. The hook-typed wiper arm 3A is a conventional wiper arm and has a hook 31A at a front end thereof. When assembled, the upper lid 28a pivoted to the connection member 27a is opened, and the hook 31A at the front end of the wiper arm 3A is inserted through the hollow portion of the connection member 27a and connected to the cylindrical post 261a in the limit trough 26a of the first connection unit 2a, and then the upper lid 28a is closed. The curved side surface 283a of the protrusion 282a at the rear end of the upper lid 28a is against the bent portion of the hook 31A so as to secure the wiper arm 3A.

Figure 5:
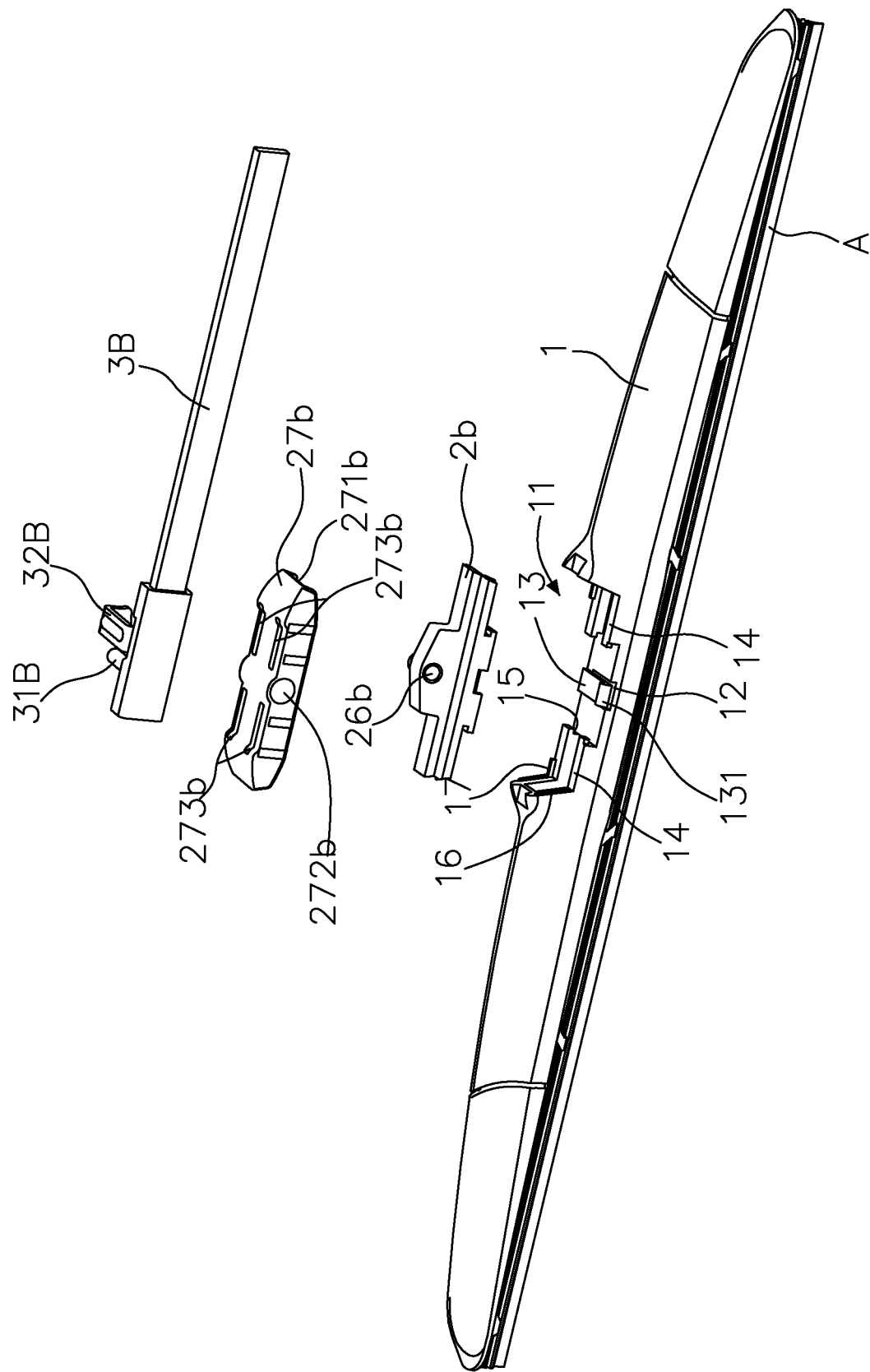
FIG. 5 is an exploded view showing the second connection unit and the pin-typed wiper arm according to the preferred embodiment of the present invention.
Figure 5A:
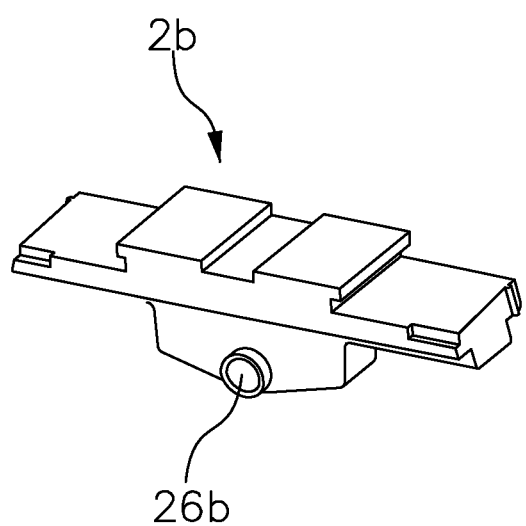
FIG. 5A is a perspective view showing the second connection unit according to the preferred embodiment of the present invention.
Figure 5B:
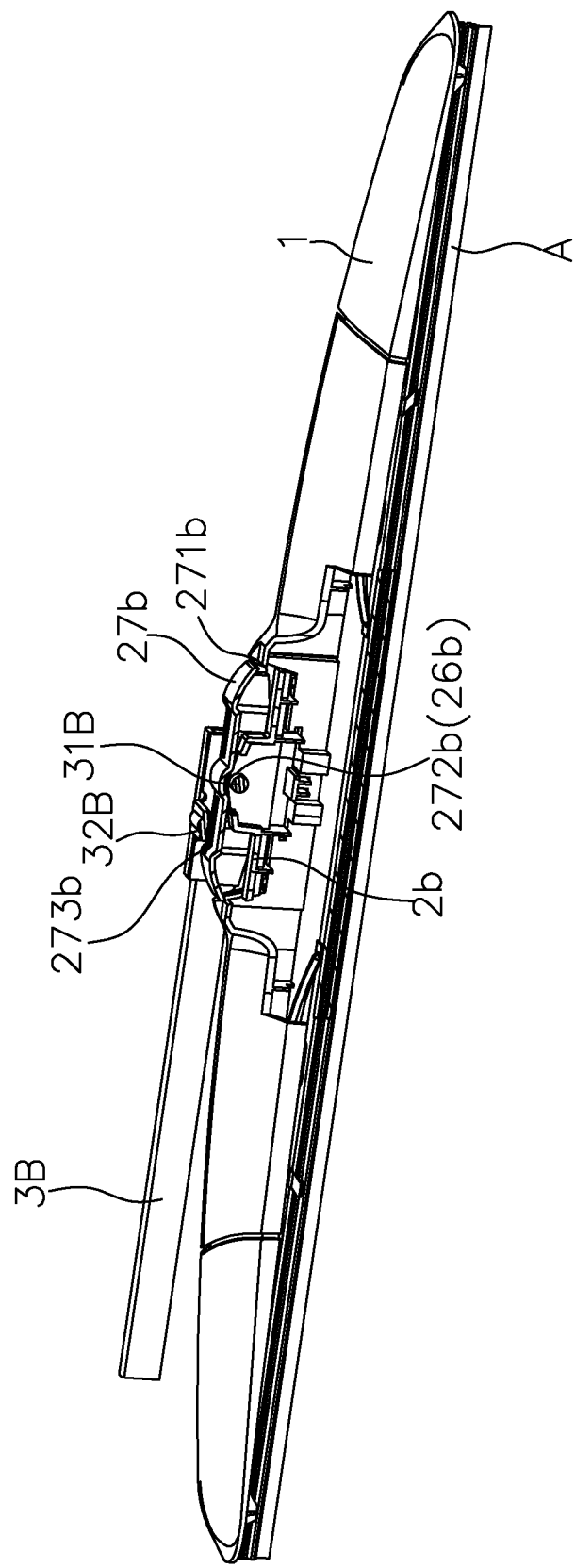
FIG. 5B is a schematic view showing the second connection unit and the hook-typed wiper arm according to the preferred embodiment of the present invention.

FIG. 5, FIG. 5A and FIG. 4B show connection of the second connection unit 2b of the present invention and a pin-typed wiper arm 3B. The connection of the second connection unit 2b and the wiper post 1 is same as the aforesaid. The second connection unit 2b has a pivot hole 26b at a top end thereof. A connection member 27b is fitted on the second connection unit 2b. The connection member 27b has a hollow lower end and a U-shaped engaging trough 271b facing down. The connection member 27b has a circle hole 272b corresponding in position to the pivot hole 26b and a plurality of slots 273b on a top end thereof to communicate with the engaging trough 271b. The second connection unit 2b uses the connection member 27b to connect the pin-typed wiper arm 3B. The pin-typed wiper arm 3B is a conventional wiper arm, and has a pin 31B and a hook 32B. When assembled, the pin 31B of the wiper arm 3B is inserted in the circle hole 272b of the connection member 27b and the pivot hole 26b of the second connection unit 2b and the hook 32B of the wiper arm 3B is engaged in the slots 273b of the connection member 27b, such that the second connection unit 2b is connected with the wiper arm 3B.

Figure 6:
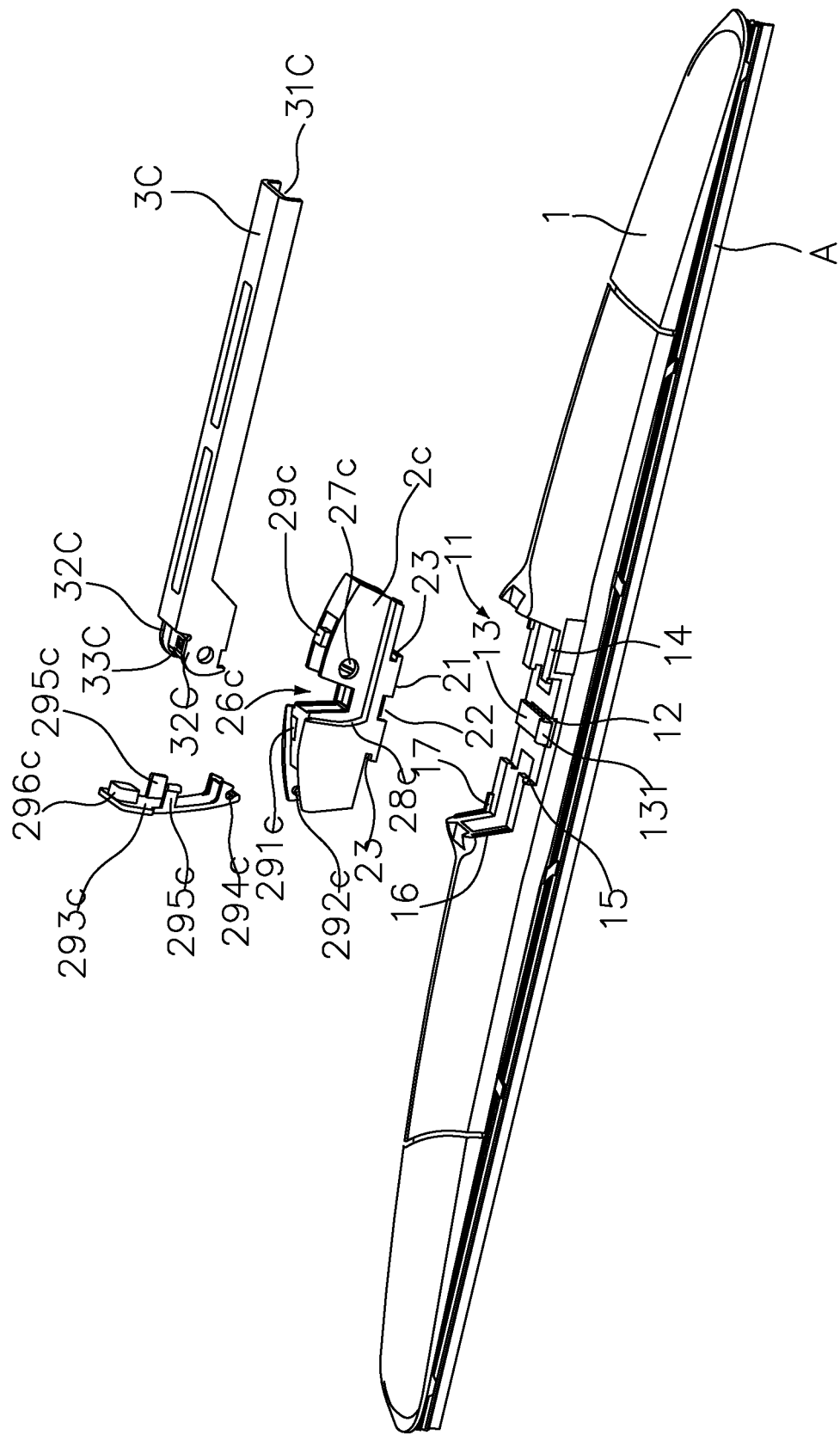
FIG. 6 is an exploded view showing the third connection unit and the conventional wiper arm according to the preferred embodiment of the present invention.
Figure 6A:
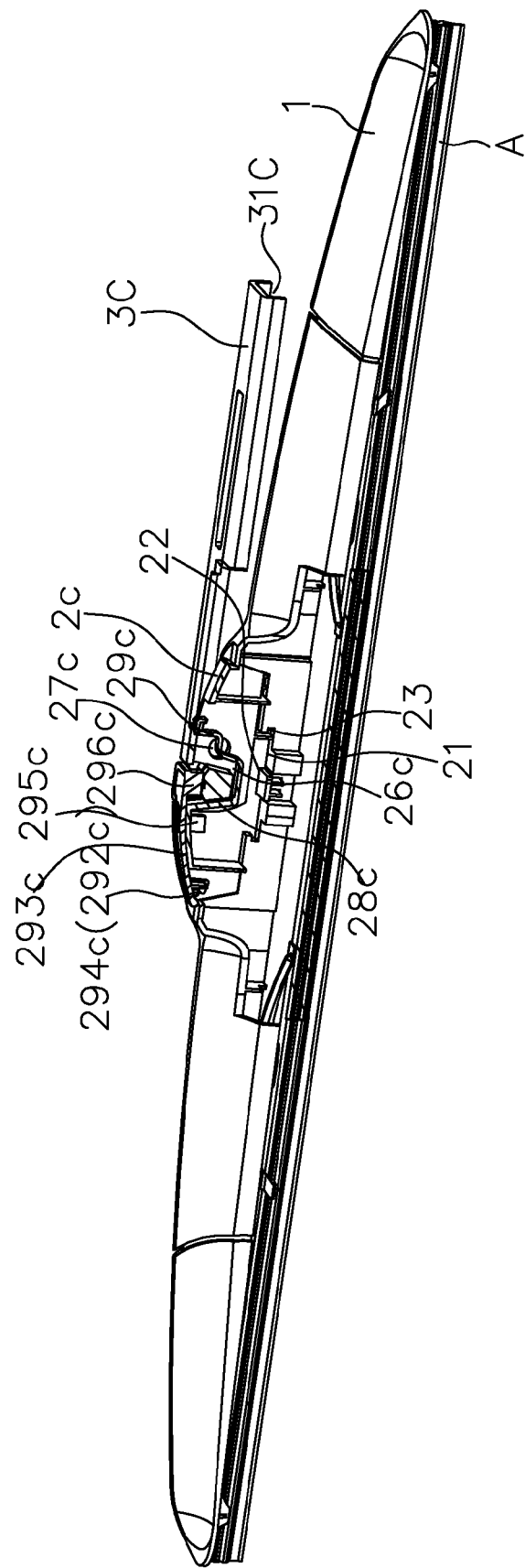
FIG. 6A is a schematic view showing the third connection unit and the conventional wiper arm according to the preferred embodiment of the present invention.

FIG. 6 and FIG. 6A show connection of the third connection unit 2c of the present invention and a conventional wiper arm 3C. The connection of the third connection unit 2c and the wiper post 1 is same as the aforesaid. The third connection unit 2c has a V-shaped opening 26c, a mounting hole 27c, a limit step 28c beside the opening 276c, and a resilient engaging piece 29c which is disposed inside the third connection unit close to the mounting hole 27c. An upper end of the third connection unit 2c has a buckle recess 291c and a pivot 292c at one end of the buckle recess 291c for connection of an upper lid 293c. The upper lid 293c has a front end formed with an open recess 294c corresponding to the pivot 292c, two engaging detents 295c at a middle portion thereof, and a press block 296c at a rear end thereof. The wiper arm 3C is a conventional wiper arm, and has a U-shaped engaging trough 31C, a pair of lugs 32C at a front end thereof, and a mating surface 33C between the pair of lugs 32C. When assembled, the wiper arm 3C is fitted on the third connection unit 2c. The pair of lugs 32C at the front end of the wiper arm 3C is against the limit step 28c of the third connection unit 2c to position the wiper arm 3C. Through the open recess 294c of the upper lid 293c mating with the pivot 292c of the third connection unit 2c, the upper lid 293c is closed and the two engaging detents 295c of the upper lid 293c extend in the buckle recess 291c and the press block 296c at the rear end of the upper lid 292c holds against the mating surface 33C of the wiper arm 3C, such that the third connection unit 2c and the wiper arm 3C are connected steadily.

Figure 7:
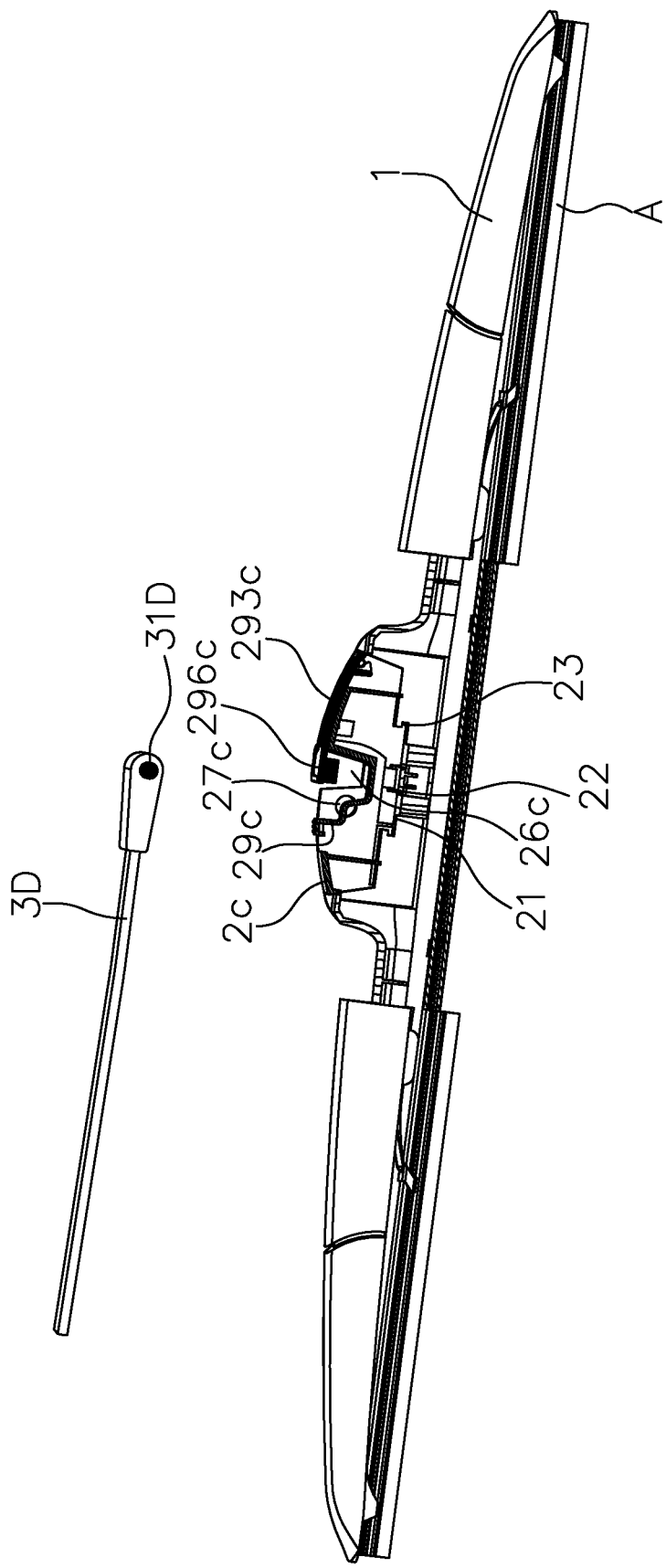
FIG. 7 is an exploded view showing the third connection unit and another pin-typed wiper arm according to the preferred embodiment of the present invention.
Figure 7A:
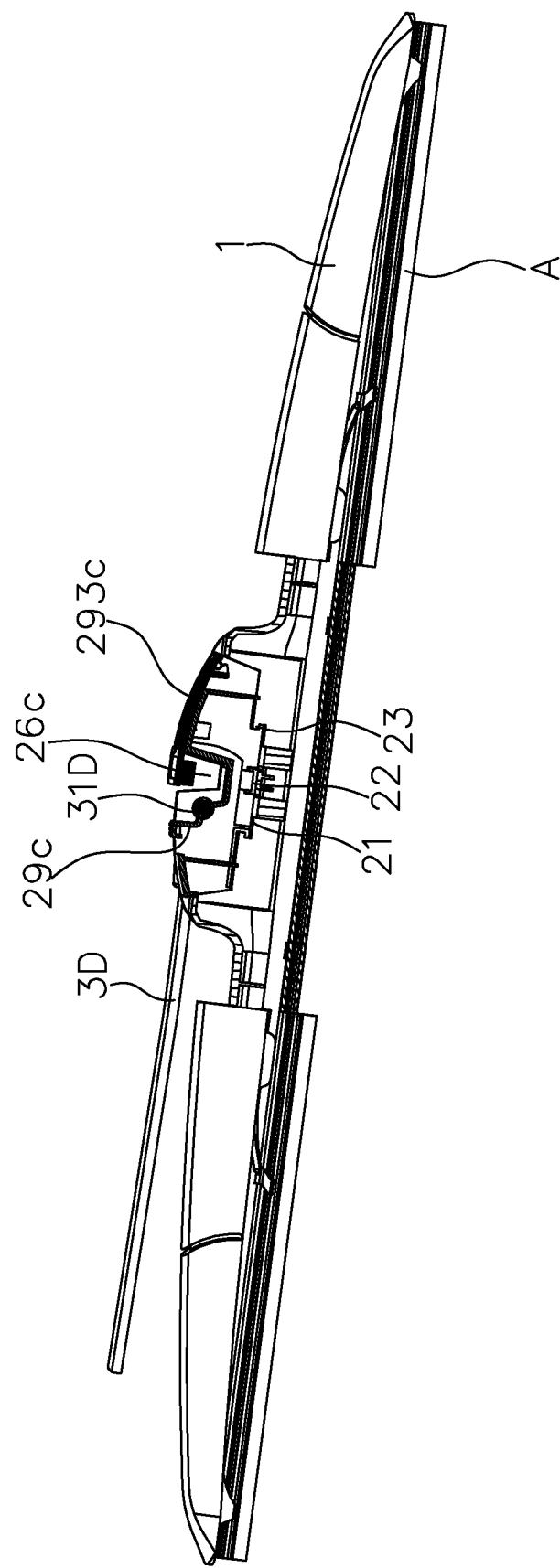
FIG. 7A is a schematic view showing the third connection unit and another pin-typed wiper arm according to the preferred embodiment of the present invention.

Similarly, the third connection unit 2c of the present invention can be connected with another pin-typed wiper arm 3D. As shown in FIG. 7 and FIG. 7A, the wiper arm 3D is a conventional wiper arm, and has a pin 31D at a front end thereof. When assembled, the pin 31D of the wiper arm 3D is inserted in the mounted hole 27c of the third connection unit 2c. During insertion, the pin 31D pushes away the resilient engaging piece 29c in the third connection unit 2c. After the pin 31D is fully inserted, the pin 31D is pressed and positioned by the resilient engaging piece 29c, such that the third connection unit 2c is connected with the wiper arm 3D firmly.

As the above-mentioned, the wiper post and the connection unit of the present invention are detachably connected. This is convenient for replacement of the connection unit. The connection unit has a configuration to mate with different wiper arms, so that the wiper post can be connected with various wiper arms through the connection unit.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A windshield wiper, comprising a wiper post and a connection unit which is used to connect the wiper post and a wiper arm, characterized by: the wiper post having a bottom connected with a rubber blade, the wiper post having an opening at a central portion thereof, a recess at a central bottom of the opening and a resilient plate disposed on the recess, one end of the resilient plate being connected with the bottom of the opening, another end of the resilient plate being suspended above the recess and having an engaging buckle, the opening having protruding steps which are formed at two sides of the resilient plate, the protruding steps each having a vertical surface formed with a lumpy section;

the connection unit being detachably mounted in the opening of the wiper post, the connection unit having a bottom formed with a protruding platform corresponding to the opening, the protruding platform having a slide trough at a central portion thereof corresponding to the resilient plate, two sides of the protruding platform each having a vertical surface formed with a lumpy portion corresponding to the lumpy section of the opening.

2. The windshield wiper as claimed in claim 1, wherein a side wall of the opening is formed with an engaging groove and a stop piece which are spaced, an end of the connection unit having a protruding rib corresponding to the engaging groove and a notch corresponding to the stop piece, when the connection unit being mounted in the opening, the notch being against the stop piece and the protruding rib being engaged in the engaging groove.

3. The windshield wiper as claimed in claim 1, wherein an engaging platform is provided on the slide trough, after the connection unit being mounted, the engaging buckle of the resilient plate cooperating with the engaging platform to press the connection unit tightly.

4. The windshield wiper as claimed in claim 1, wherein the connection unit is a first connection unit used to connect a hook-typed wiper arm, the first connection unit having a limit trough at a central portion thereof and a cylindrical post in the limit trough, the limit trough being to receive a connection member therein, the connection member having a hollow middle portion and an engaging recess facing down, when assembled, the engaging recess of the connection member being engaged on the cylindrical post of the limit trough of the first connection unit, front and rear ends of the connection member each having a pin hole for insertion of a pin which is pivotally connected with an upper lid, the upper lid having a front end formed with a pivot hole and a rear end formed with a protrusion, the protrusion having a curved side surface to secure the hook-typed wiper arm.

5. The windshield wiper as claimed in claim 1, wherein the connection unit is a second connection unit used to connect a pin-typed wiper arm, the second connection unit having a pivot hole at a top end thereof, a connection member fitted on the second connection unit, the connection member having a hollow lower end and a U-shaped engaging trough facing down, the connection member having a circle hole corresponding in position to the pivot hole and a plurality of slots on a top end thereof to communicate with the engaging trough.

6. The windshield wiper as claimed in claim 1, wherein the connection unit is a third connection unit used to connect a conventional wiper arm, the third connection unit having a V-shaped opening, a mounting hole, a limit step beside the opening and a resilient engaging piece which is disposed inside the third connection unit close to the mounting hole, an upper end of the third connection unit having a buckle recess and a pivot at one end of the buckle recess for connection of an upper lid, the upper lid having a front end formed with an open recess corresponding to the pivot, two engaging detents at a middle portion thereof and a press block at a rear end thereof.

* * * * *